United States Patent
Hélot et al.

(10) Patent No.: US 10,703,289 B2
(45) Date of Patent: Jul. 7, 2020

(54) MOTOR VEHICLE HAVING AT LEAST ONE FLAP

(71) Applicant: AUDI AG, Ingolstadt (DE)

(72) Inventors: Jacques Hélot, Ingolstadt (DE); Joris Mertens, Ingolstadt (DE); Immo Redeker, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/337,580

(22) PCT Filed: Nov. 17, 2017

(86) PCT No.: PCT/EP2017/001354
§ 371 (c)(1),
(2) Date: Mar. 28, 2019

(87) PCT Pub. No.: WO2018/108306
PCT Pub. Date: Jun. 21, 2018

(65) Prior Publication Data
US 2020/0031313 A1    Jan. 30, 2020

(30) Foreign Application Priority Data

Dec. 14, 2016 (DE) .................. 10 2016 014 864

(51) Int. Cl.
*B60R 25/20* (2013.01)
*B60R 9/06* (2006.01)
(Continued)

(52) U.S. Cl.
CPC ............... *B60R 5/04* (2013.01); *B60R 9/065* (2013.01); *G07C 9/00896* (2013.01);
(Continued)

(58) Field of Classification Search
None
See application file for complete search history.

(56) References Cited

U.S. PATENT DOCUMENTS 6,616,389 B1 * 9/2003 Ament .................. B60R 7/005
410/100
2007/0200673 A1    8/2007 Godwin et al.
(Continued)

FOREIGN PATENT DOCUMENTS

DE    102012013390 A1    1/2014
DE    102014108760 A1    12/2015
(Continued)

OTHER PUBLICATIONS

Toyota, Toyota 2009 Highlander Owner's Manual (OM48853U), pp. 54, 55, 77, and 78 (Year: 2009).*
(Continued)

*Primary Examiner* — Daniell L Negron
(74) *Attorney, Agent, or Firm* — Maier & Maier, PLLC

(57) ABSTRACT

The disclosure relates to a motor vehicle having at least one flap, which can be moved between an open and a closed position, an encodable locking device for locking the flap, an unlocking device for unlocking the encodable locking device, and at least one further access opening which is adapted to the size of a specific postal article and can be closed by at least one additional flap. The access opening can be locked by an encodable locking device and can be unlocked by an unlocking device.

6 Claims, 2 Drawing Sheets

(51) Int. Cl.
*B60R 11/00* (2006.01)
*G07C 9/00* (2020.01)
*B60R 5/04* (2006.01)
*B60J 5/10* (2006.01)

(52) U.S. Cl.
CPC ........... *B60J 5/104* (2013.01); *B60R 25/2018* (2013.01); *B60R 2011/004* (2013.01); *B60R 2325/108* (2013.01); *G07C 2009/00769* (2013.01)

(56) References Cited

U.S. PATENT DOCUMENTS

| | | | | |
|---|---|---|---|---|
| 2010/0253519 | A1* | 10/2010 | Brackmann | B60P 3/03 340/572.1 |
| 2016/0342943 | A1 | 11/2016 | Wiechers et al. | |

FOREIGN PATENT DOCUMENTS

| | | |
|---|---|---|
| DE | 102014115933 A1 | 5/2016 |
| DE | 102014226069 A1 | 6/2016 |

OTHER PUBLICATIONS

Estes AWS, "Customizable Ford PIU Configurations", https://estesaws.com/customizable-ford-piu-configurations/ (Year: 2016).*

International Preliminary Report on Patentability (Chapter I) dated Jun. 27, 2019, of corresponding International application No. PCT/EP2017/001354; 7 pages.

German Office Action dated Mar. 27, 2019, in connection with corresponding DE Application No. 10 2016 014 864.0 (12 pgs., including machine-generated English translation).

International Search Report and Written Opinion dated Jan. 12, 2018 in corresponding International Application No. PCT/EP2017/001354; 22 pages.

* cited by examiner

MOTOR VEHICLE HAVING AT LEAST ONE FLAP

The disclosure relates to a motor vehicle having at least one flap, which can be moved between an open and a closed position.

BACKGROUND

Such motor vehicles are known from the general state of the art. For example, the flap may be a motor vehicle's trunk lid.

Recently, there has been a tendency to have parcels delivered to motor vehicles in order to open up further possibilities for the delivery of parcels. This is particularly useful if the recipient is not at home during the day and has no facilities in his house or apartment where a parcel courier can deliver a parcel. In this case, for example, the courier can take the parcel to the vehicle parked on a parking lot in front of an office building.

The problem with these proposals is that the parcel courier is always given access to the entire vehicle via the trunk lid. This is not only problematic with regard to theft, but also reduces the chance of this method being accepted by parcel service providers, since the parcel couriers could be wrongly accused of the possible loss of objects.

DE 10 2014 226 069 A1 describes a method for transferring recently acquired purchase goods, for which certain persons are given access to a motor vehicle to allow them to deposit goods previously purchased in a store in the motor vehicle. However, the method described therein cannot contribute to the above problem of free access for the courier to the trunk or other parts of the motor vehicle.

SUMMARY

It is therefore the task of the present invention to create a motor vehicle with a flap which can be moved between an open and a closed position, which allows third parties to delivery parcels but which but makes access to the entire motor vehicle more difficult.

By means of at least one other access opening adapted to the size of a given postal article, it is possible for a third person, for example a parcel courier, to deposit postal articles in the motor vehicle without opening the actual flap allowing access to the entire motor vehicle. This represents a significant increase in safety for the owner of the motor vehicle, who allows a third party, such as a parcel courier, to open his motor vehicle in order to gain access to it. It is particularly advantageous that the access opening can be adapted to the size of certain postal articles, so that the dimensions of the access opening are adapted to those of the postal articles and, for example, smaller parcels can be deposited in the motor vehicle through the wider access opening.

A further advantage of the disclosure-related solution then comes to bear, if several persons wish to deposit parcels in the motor vehicle, as this can occur through different access openings and therefore a second courier cannot remove the postal article previously deposited by a first courier from the motor vehicle. Furthermore, it is advantageous that, during bad weather, no dirt or moisture can get into the motor vehicle through a preferably smaller opening.

In a very advantageous additional development of the disclosure, it can be provided that the at least one further flap is designed as part of the first flap and can be locked and unlocked independently of the first flap. This is a particularly easy to implement embodiment of the invention, which can also very easily be operated by third parties, such as parcel couriers.

Alternatively, it may be provided that at least one other flap is associated with a roof or fender of the motor vehicle. In this case, too, the disclosure is comparatively easy to implement, which may also lead to better acceptance by the respective parcel service providers.

For example, it may be provided that the at least one other access opening is adapted to the size of a standard letter. This makes access to the entire interior of the vehicle considerably more difficult, whereas a standard letter can be inserted very easily through such an opening.

To be able to store a wide variety of postal articles in the vehicle, several additional access openings may also be provided.

A further advantageous embodiment of the invention may be that a barcode reading device and a transmitting device for transmitting messages to a user terminal are arranged in the region of the at least one further access opening. This enables a third party, in particular a parcel courier, to easily gain access to the access opening provided for him and, at the same time, to send messages to the respective recipient regarding the delivery of the postal article.

Two separately lockable compartments in the trunk of a motor vehicle enable two different persons using the same motor vehicle to store their personal belongings in such a compartment. This makes it much easier for different people to use the motor vehicle.

To be able to very easily lock and open the two lockable compartments, it may also be provided that the at least two lockable compartments can be locked by means of encodable locking devices.

BRIEF DESCRIPTION OF THE FIGURES

Examples of how the invention can be embodied are shown in principle on the basis of the illustration below.

This shows.

DETAILED DESCRIPTION

Figure 1:
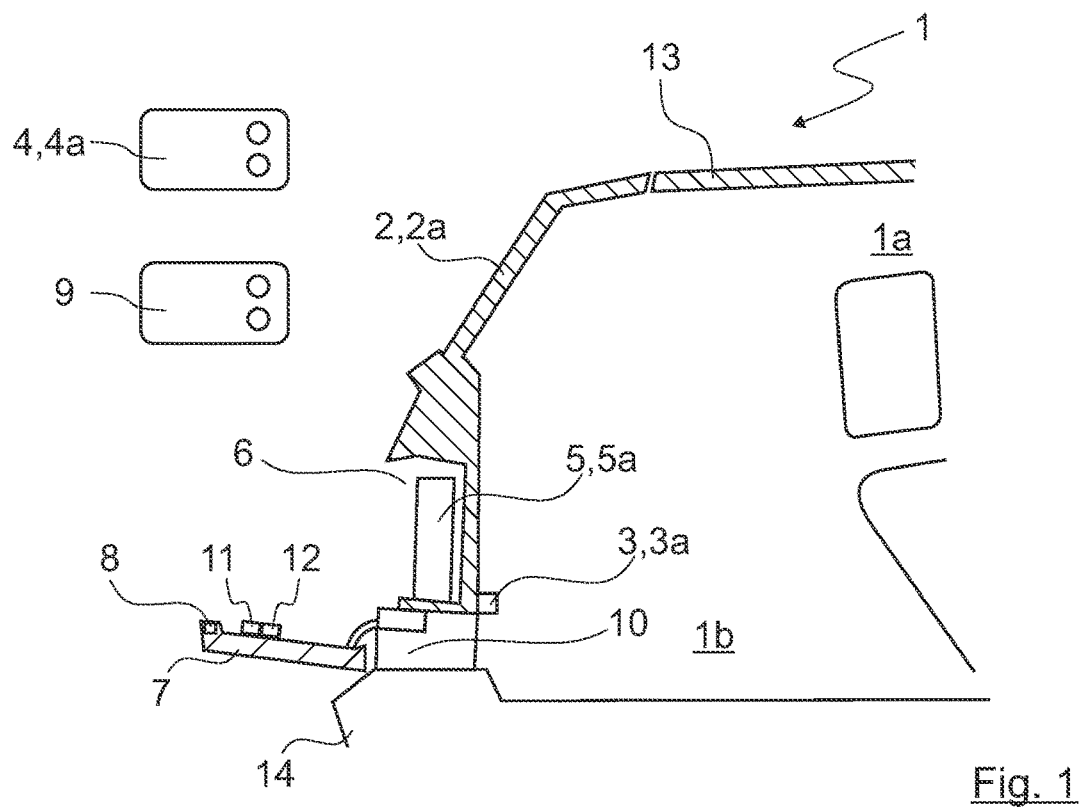
FIG. 1 A first embodiment of the motor vehicle of the invention in a first position.
Figure 2:
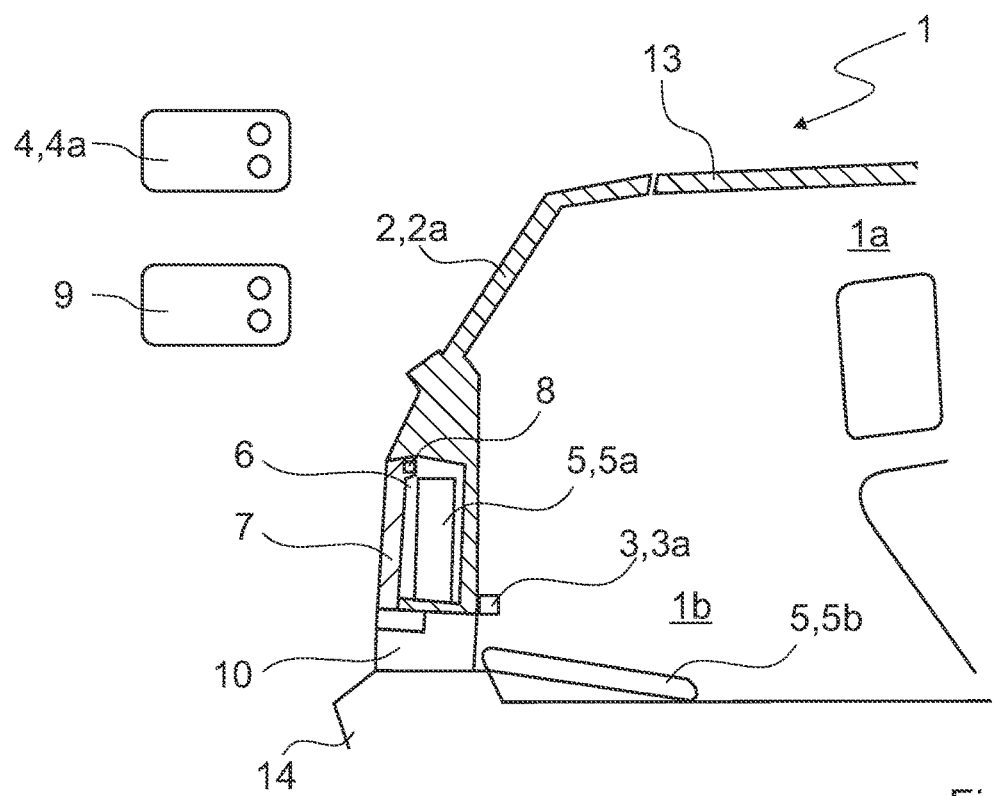
FIG. 2 the motor vehicle from FIG. 1 in a second position.

FIG. 1 shows the rear part of a motor vehicle 1, which in this area has a flap 2 which can be moved in a known manner between an open and a closed position and which allows access to an interior 1a of a motor vehicle 1. In this case, Flap 2 is a trunk lid 2a which serves to close a trunk 1b and is shown in its closed position in both FIGS. 1 and 2.

The flap 2 can be locked by means of an encoded locking device 3, in this case a lock 3a, which is only indicated very schematically, and can be unlocked by means of an unlocking device 4, in this case a radio key 4a, which is also only shown schematically. Other unlocking devices would of course also be conceivable instead of the radio key 4a, such as cards, correspondingly programmed mobile telephones or similar. As both the locking device 3 and the unlocking device 4 and their respective modes of operation are known, these are not described in detail here.

In the present case, flap 2 has a further access opening 6 adapted to the size of a specific postal article 5, which can be closed by means of a further flap 7. The further flap 7 is illustrated in FIG. 1 in its opened state and in FIG. 2 in its closed state. The further flap 7 can be locked in a similar way to the trunk lid 2 by means of an encodable locking device 8 and unlocked by means of an unlocking device 9. Again, both the locking device 8 and the unlocking device 9 are only shown very schematically. The unlocking device 9 is preferably available as multiple units and should be available to a third party who does not own the motor vehicle, e.g. a parcel courier. This enables the parcel courier to open the locking device 8 and therefore the flap 7 by means of the unlocking device 9. In this way, he has access to the access opening 6 and can place the postal article 5, in this case a parcel 5a, through the access opening 6 in flap 2 and then close flap 7, which then preferably locks automatically. This allows the postal article 5 to be delivered to the motor vehicle 1 without gaining access to the interior 1a of motor vehicle 1. For example, mobile end devices of the respective user, such as mobile telephones, could also be configured as unlocking devices 4 or 9. In the exemplary embodiment shown in FIG. 1, the further flap 7 is thus configured as part of the first flap 2 and can be locked independently of the first flap 2 by means of the locking device 8 and unlocked by means of the unlocking device 9.

For example, unlocking device 4 could be configured so that it could open both locking devices 3 and 8, whereas a parcel courier could only be provided with an unlocking device 9 suitable for opening locking device 8.

In principle, it could be determined before delivery, for example already at the time of ordering, which of the access openings 6, 10 or the access opening to the passenger compartment 1a or the luggage compartment 1b of motor vehicle 1 opened by the trunk lid 2a is best suited for the respective postal article and in this case the parcel courier could only gain access to the respective access opening. Furthermore, it is preferable if the GPS data of motor vehicle 1 and preferably its registration number are transmitted to the parcel service providers when the order is placed or when an appointment is scheduled.

Figure 4:
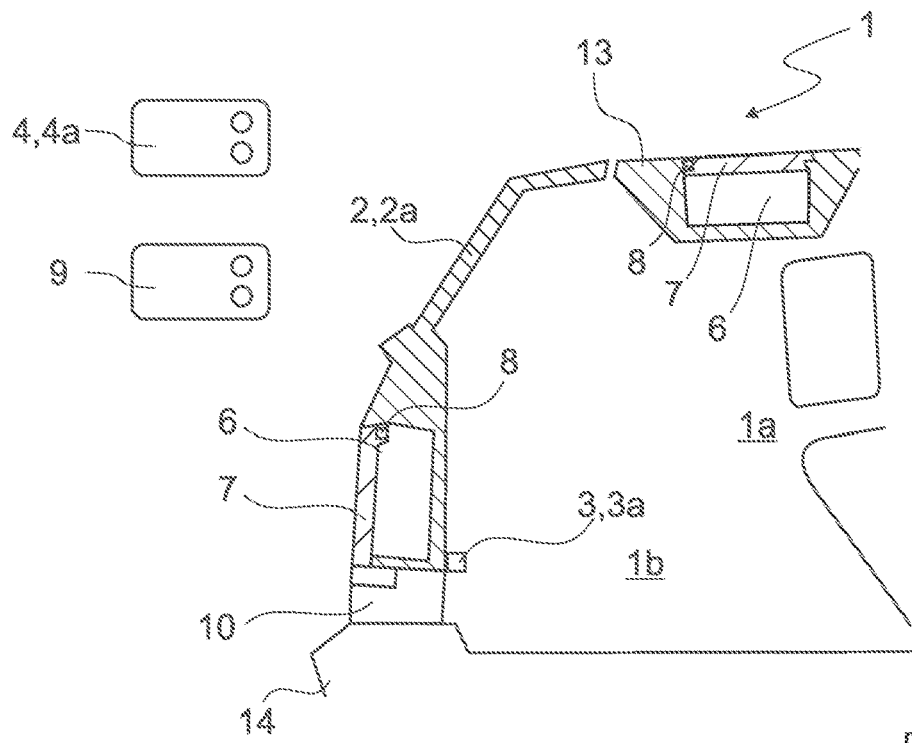
FIG. 4 a third embodiment of the motor vehicle of the invention.

In the version of FIG. 1, there is a further access opening 10 below the access opening 6 which can be closed with the flap 7 and which can be closed by means of a flap not shown in this case. The second access opening 10 in the present case is adapted to the size of a standard letter 5b, which in this case forms the postal article 5. If necessary, the further access opening 10 would also be feasible without the access opening 6 described above. In the present case, a barcode reading device 11 and a transmitting device 12 for transmitting messages to a user terminal, in particular to the mobile telephone of the user or owner of the motor vehicle 1, are configured in the area of the at least one further flap 7. In the version of FIG. 4, the least one further flap 7 and the access openings 6 and/or 10 could also be associated with a roof 13 or a fender 14 of the motor vehicle 1.

Figure 3:
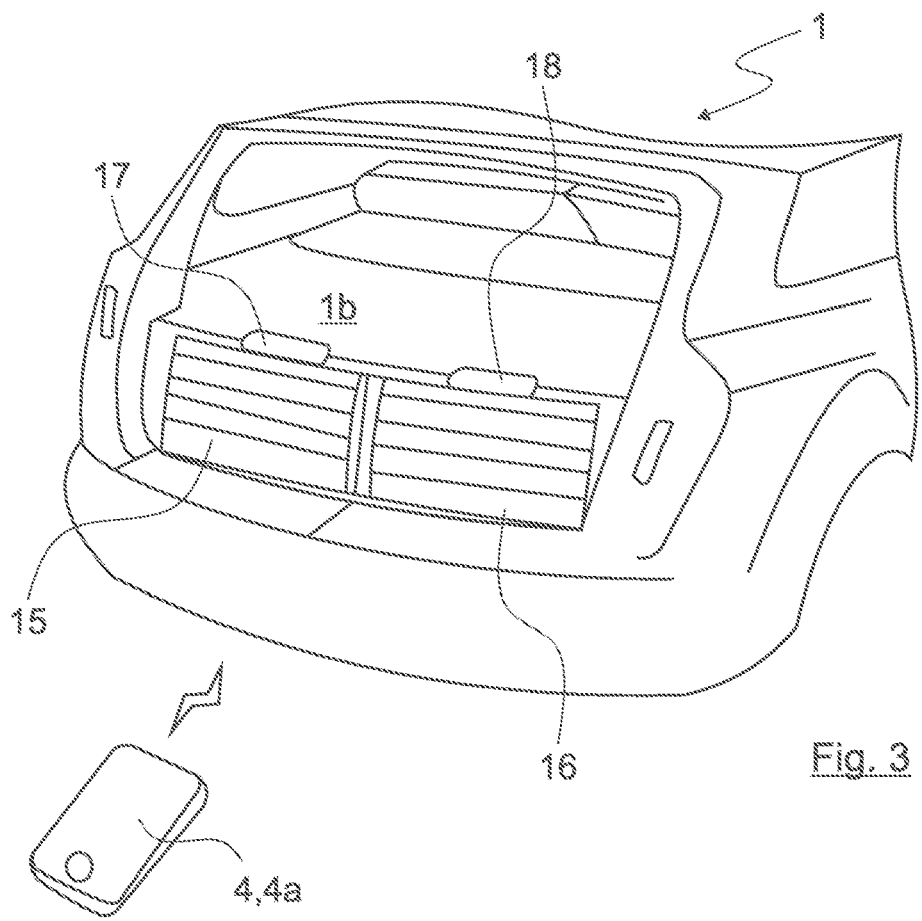
FIG. 3 a second embodiment of the motor vehicle of the invention.

FIG. 3 shows an additional embodiment of the motor vehicle 1. Again, the trunk 1b can be closed by means of the trunk lid 2a, which is not shown in this case and can be moved between an open and a closed position. The trunk lid 2a includes the encodable locking device 3 for locking it, which is also not illustrated, and the unlocking device 4 for unlocking the locking device 3. As the trunk lid 2 is not illustrated, the locking device 2 is also not illustrated. However, the unlocking device 4, again configured as radio key 4a, can be seen in FIG. 3.

Two independently lockable compartments 15 and 16 are arranged in the trunk 1b. This makes it possible for two different persons using the motor vehicle 1 to place their respective objects in one of the compartments 15 and 16 respectively. In the present case, compartments 15 and 16 can be locked by means of respective encodable locking devices 17 and 18. For example, one of the two compartments 15 or 16 could also be made available to a third party, for example a parcel courier, to store postal articles.

The two locking devices 17 and 18 can be opened by means of unlocking devices not shown. If necessary, one of the unlocking devices for unlocking the locking device 17 and/or 18 can also be integrated into one of the unlocking devices 4 and/or 9 if the embodiment shown in FIG. 3 is combined with the embodiment shown in FIGS. 1 and 2.

The invention claimed is:

1. A motor vehicle, comprising:
at least one first flap, which allows access to an interior of the motor vehicle and can be moved between an open and a closed position, with an encodable locking device for locking the first flap, and with an unlocking device for unlocking the encodable locking device, wherein at least one further access opening, which is adapted to the size of a postal article, can be closed by at least one further flap, can be locked by an encodable locking device and can be unlocked by an unlocking device, wherein the at least one further flap is configured as part of the first flap and can be locked and unlocked independently of the first flap, and wherein the at least one further access opening does not allow access to the interior of the motor vehicle.

2. The motor vehicle of claim 1, wherein the at least one further access opening is adapted to the size of a standard letter.

3. The motor vehicle of claim 1, wherein at least two further access openings are provided.

4. The motor vehicle of claim 1, wherein a barcode reading device and a transmitting device for transmitting messages to a user terminal are arranged in the region of the at least one further access opening.

5. The motor vehicle of claim 1, further comprising a trunk, which can be locked with the at least one first flap, and at least two independently lockable compartments arranged in the trunk.

6. The motor vehicle of claim 5, wherein the at least two lockable compartments can be locked by means of encodable locking devices.

* * * * *